Sept. 23, 1969    T. J. SANTALA    3,468,015
PROCESS OF MANUFACTURING STRIP CONTACT MATERIAL BY INLAYING
PERIPHERALLY CLAD NOBLE-METAL STRIP
Filed Oct. 31, 1966
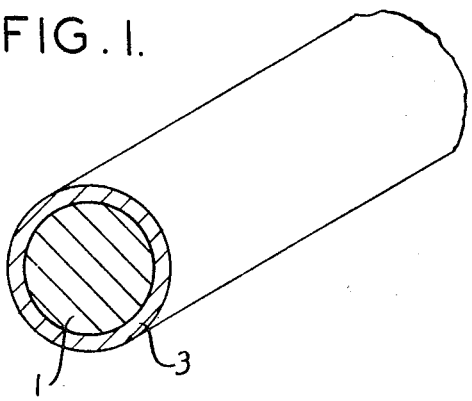
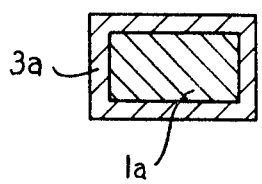
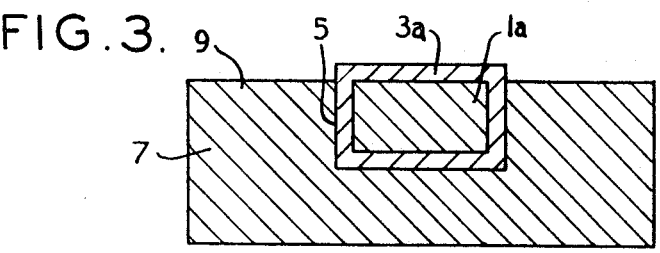
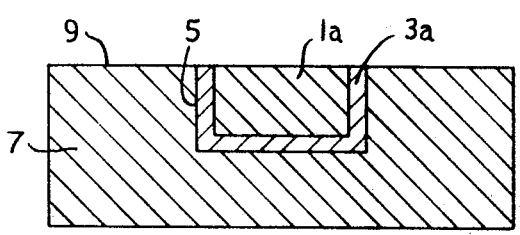
Teuvo J. Santala,
Inventor.
Koenig, Senniger, Powers and Leavitt,
Attorneys.

United States Patent Office 3,468,015
Patented Sept. 23, 1969

3,468,015
PROCESS OF MANUFACTURING STRIP CONTACT MATERIAL BY INLAYING PERIPHERALLY CLAD NOBLE-METAL STRIP
Teuvo J. Santala, Attleboro, Mass., assignor to Texas Instruments Incorporated, Dallas, Tex., a corporation of Delaware
Filed Oct. 31, 1966, Ser. No. 590,835
Int. Cl. B23k 31/02
U.S. Cl. 29—481                             2 Claims

ABSTRACT OF THE DISCLOSURE

A round core rod or wire of a noble metal is clad with a metallic diffusion barrier material. The clad rod is worked into a substantially rectangular configuration, then fitted and bonded into a substantially rectangular groove of a base strip composed of a base metal so as to form a composite of the strips with a barrier layer located therebetween. The dimensions are selected such that the bonded strip including a substantially U-shaped part of the barrier layer fills the groove but its outer clad portion forms a protrusion. Then the protrusion is machined to remove the outer portion of the cladding and expose the noble metal in the form of an inlaid surface flush with the surface of the base strip, the cladding forming a substantially U-shaped diffusion-barrier between the strips.

---

This invention relates to the manufacture of strip contact material comprising a precious metal face on a base metal support.

Among the several objects of the invention may be noted the provision of a method for manufacturing strip material from two different metals without excessive diffusion between the metals; the provision of a simple and economical method for manufacturing strip material from a plurality of metals including a thin strip of noble metal without forming a eutectic or a brittle intermetallic compound of the noble metal and another metal, and to such a method wherein undesirable diffusion between the noble metal and other metal is substantially prevented; and the provision of strip contact material manufactured according to the method of the invention. Other objects and features will be in part apparent and in part pointed out hereinafter.

The invention accordingly comprises the constructions and methods hereinafter described, the scope of the invention being indicated in the following claims.

In the accompanying drawnigs, in which one of various possible embodiments of the invention is illustrated, FIG. 1 is a fragmentary perspective view of certain clad-wire starting material;

FIG. 2 is a cross section showing the starting material after it has been worked to a rectangular cross-sectional shape;

FIG. 3 is a cross section showing the FIG. 2 material bonded to a backing layer; and FIG. 4 is a section showing a strip contact material manufactured according to the invention.

Corresponding reference characters indicate corresponding parts throughout the several views of the drawings. The drawings are illustrative and not to scale.

In many cases an undesirable result occurs when two dissimilar metals are bonded together, one of which may be reactive in some manner with respect to the other. For example, the bonding step may result in the formation of a low melting eutectic, such as occurs upon bonding gold to beryllium copper alloy or, in some cases, a brittle intermetallic compound may be formed. Also, in some instances it is undesirable to have excessive diffusion from one layer to another since such diffusion may adversely aflect the desired properties of one of the strip materials. For these reasons a barrier or interliner should be interposed between a base metal strip which carries another metal strip to maintain physical separation between them. However, there has been no simple and economical method for bonding strip material to an interliner. The present invention provides such a method.

Referring to the drawings, FIG. 1 shows a starting material comprising a rod 1 composed of a noble metal such as gold, silver or other metal suitable for use, for example, as an electrical contact surface in a switch or the like. The term "rod" as used herein includes wires and other comparatively small-gauge stock. The rod is clad in the usual manner throughout its length with a layer 3 of metallic barrier material. This may be composed of nickel, stainless steel, molybedenum or like barrier-forming material. The layer 3 is substantially the same thickness throughout the circumference of the rod. The cladding operation may be performed by electroplating, solid-phase pressure bonding, or by any other operations which will produce a good metallurgical bond between the cladding layer 3 and the core rod 1. Alternatively, the desired bond may be produced in the subsequent processing steps.

The rod 1 and the clad metal layer 3 on it are worked from the round to a generally rectangular transverse cross section. This may be accomplished by rolling the clad rod or by other suitable mechanical operations. The resulting strip, illustrated in section in FIG. 2, comprises a core designated 1a of generally rectangular section covered by the clad metal indicated at 3a.

Referring to FIG. 3, a shallow groove 5 having a flat bottom and substantially straight parallel sides is milled or otherwise machined in a strip 7 of base material such as beryllium copper alloy. Then the clad strip is placed in groove 5 and bonded under heat and pressure to the surfaces of the groove. The bonding may be accomplished either by solid-phase bonding or by liquid-phase bonding techniques or any other to obtain a good metallurgical bond. Preferably, the size of the clad strip and groove 5 are such that the clad strip substantially fills groove 5 and projects above the upper surface 9 of the base strip by an amount substantially equal to or more than the thickness of clad layer 3a.

After bonding has been completed the upper surface of the clad strip is machined as by milling to remove the interliner material 3a above surface 9 and thus expose the upper surface of core material 1a. This leaves the barrier material 3a with a U-shaped cross section. This milling may be simply down to the upper surface 9 of the base metal 1a. Or, it may involve milling below the upper surface 9 of the base layer 7 and into the core 1a, as desired. Since core 1a is preferably a precious metal and therefore costly, it is normally made thin. Only very little of it needs removal during the milling step in order to expose the contact material 1a.

As shown in FIG. 4, the resulting article comprises a strip of the core material 1a which is entirely separated or isolated from the base material 7 by U-shaped barrier or interliner material 3a. The upper surface 9 of the base 7 is flush with the upper surface of material 1a and the upper edges of the material 3a. The material 1a thus forms a flush stripe in the top of base material 7.

Strip metal material formed according to the method of the invention is both economical and is produced by a comparatively simple method. Since the metal of layer 1a is completely isolated from the metal of layer 7, no eutectic or brittle intermetallic compound can be formed by these two metals. Moreover, layer 3a prevents excessive diffusion between the metals of layers 1a and 7. The use of the interliner 3a of U-shaped cross section in the groove 5 also avoids direct contact and therefore undesired interaction between the edges of the strip 1a and the backing 7, such as would occur if a barrier strip were bonded on the surface of the backing 7 with a precious metal strip bonded on the barrier strip.

Suitable materials for the various parts are as follows, for example: For the base strip 7, copper, beryllium copper, or Phosphor bronze; for the barrier layer 3a, nickel, stainless steel or molybdenum; and for the precious-metal strip 1a, gold, silver or platinum.

It will be understood that the barrier layer material 3a will be chosen so as to avoid undesired interaction between layer 3a and the materials of either layer 1a and layer 7 and will depend upon the materials used in layers 1a and 7.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The process of manufacturing strip contact material comprising cladding the periphery of a noble-metal strip with a metallurgically bonded diffusion-barrier metal, the clad strip being formed according to a substantially rectangular configuration, forming a substantially rectangular groove in the face of a base-metal strip, said groove being shaped to closely fit said clad strip, inserting said clad strip into the groove, said groove being made shallower than said clad strip is thick whereby the clad strip forms a protrusion from the face of the base-metal strip, metallurically bonding the interfitted strips to form a bonded composite, and machining away a sufficient amount of the protruding portion of the composite to produce an exposed inlay surface of the noble metal substantially in a face plane of the base-metal strip.

2. The process of manufacturing strip contact material comprising forming a generally rectangular groove to a certain depth in the face plane of a base-metal strip, introducing into the groove a noble-metal strip having a peripheral cladding of a metallurgically bonded diffusion-barrier metal and of generally rectangular cross section, the cladding of the clad strip having a certain thickness and the clad strip being formed closely to fit said groove and being of a thickness in excess of the groove depth by an amount approximately equal to the cladding thickness, inserting said clad strip into said groove whereby the clad noble-metal strip forms a protrusion from the base-metal strip in an amount substantially equal to the thickness of the cladding, metallurigcally bonding the interfitted strips to form a bonded composite, and machining the composite to remove cladding on the protrusion to expose a plane of the noble-metal substantially as an inlay in said plane of the face of the base-metal strip.

References Cited
UNITED STATES PATENTS

| | | | |
|---|---|---|---|
| 1,959,925 | 5/1934 | Pryde | 29—481 |
| 2,181,083 | 11/1939 | Payette. | |
| 2,395,877 | 3/1946 | Keene. | |
| 2,763,058 | 9/1956 | McCullough | 29—488 |
| 2,961,762 | 11/1960 | Clark | 29—475 |
| 3,096,577 | 7/1963 | Carlson | 29—497.5 X |
| 3,150,445 | 9/1964 | Butt | 29—471.5 |

JOHN F. CAMPBELL, Primary Examiner

B. L. ADAMS, Assistant Examiner

U.S. Cl. X.R.

29—483